(12) United States Patent
Baxter et al.

(10) Patent No.: US 7,303,210 B2
(45) Date of Patent: Dec. 4, 2007

(54) SECURE CRANK LOCKING DEVICE FOR TRAILER LANDING GEAR ASSEMBLY

(75) Inventors: Bobby G. Baxter, Warrenton, MO (US); David A. Baxter, Warrenton, MO (US)

(73) Assignee: Baxter Properties, L.L.C., Warrenton, MO (US)

( * ) Notice: Subject to any disclaimer, the term of this patent is extended or adjusted under 35 U.S.C. 154(b) by 315 days.

(21) Appl. No.: 11/076,897

(22) Filed: Mar. 10, 2005

(65) Prior Publication Data

US 2006/0202461 A1   Sep. 14, 2006

(51) Int. Cl.
*B60S 9/08* (2006.01)
(52) U.S. Cl. .................. 280/766.1; 280/763.1; 280/477; 280/475; 254/418; 254/419; 254/420; 254/424
(58) Field of Classification Search ............. 280/763.1, 280/766.1, 475, 477; 403/109.3, 109.6, 109.8, 403/109.2; 254/419, 418, 420, 424; 248/650, 248/352; D8/59, 107, 359
See application file for complete search history.

(56) References Cited

U.S. PATENT DOCUMENTS

| | | | | |
|---|---|---|---|---|
| 1,444,864 A | * | 2/1923 | Biederman ................... 74/550 |
| 1,828,980 A | * | 10/1931 | Nixon et al. ................... 74/547 |
| 1,880,134 A | * | 9/1932 | Hathorn ....................... 254/419 |
| 1,941,214 A | * | 12/1933 | Kusterle ........................ 74/547 |
| 2,062,108 A | * | 11/1936 | Rickerson ................... 403/348 |
| 3,431,795 A | * | 3/1969 | Atkinson ....................... 74/545 |
| 3,436,987 A | * | 4/1969 | Baxter .......................... 74/547 |
| 3,632,086 A | * | 1/1972 | Mai ............................ 254/419 |
| 3,771,385 A | * | 11/1973 | Benoit et al. ................. 74/547 |
| 4,385,849 A | * | 5/1983 | Crain ....................... 403/109.3 |
| 4,997,203 A | * | 3/1991 | Jensen ..................... 280/763.1 |
| 5,199,738 A | * | 4/1993 | VanDenberg ............ 280/766.1 |
| 5,322,315 A | * | 6/1994 | Carsten ................... 280/479.2 |
| 5,342,076 A | * | 8/1994 | Swindall .................. 280/479.2 |
| 5,423,518 A | * | 6/1995 | Baxter et al. ............... 254/419 |
| 5,593,171 A | * | 1/1997 | Shields .................... 280/479.2 |
| 5,904,342 A | * | 5/1999 | Laarman ..................... 254/419 |
| 6,499,258 B1 | * | 12/2002 | Borglum .......................... 52/9 |
| 6,575,656 B2 | * | 6/2003 | Suh ......................... 403/109.6 |
| 6,648,257 B2 | * | 11/2003 | Lu ............................. 242/284 |
| 6,854,916 B2 | * | 2/2005 | Hsieh ...................... 403/109.3 |

* cited by examiner

*Primary Examiner*—Christopher P. Ellis
*Assistant Examiner*—John D Walters
(74) *Attorney, Agent, or Firm*—Thompson Coburn LLP

(57) ABSTRACT

A secured crank locking device automatically secures a hand crank in its operative position to an input shaft of a gearing mechanism, with the locking device being easily disengaged to move the crank from its operative position to a stored position following rotation of the crank in the operation of the mechanism.

40 Claims, 6 Drawing Sheets

SECURE CRANK LOCKING DEVICE FOR TRAILER LANDING GEAR ASSEMBLY

BACKGROUND OF THE INVENTION (1) Field of the Invention

The present invention pertains to a crank that is manually rotated to selectively lower and raise a landing gear assembly of a truck trailer. More specifically, the present invention pertains to a locking device that automatically secures the hand crank in its operative position relative to the landing gear assembly, where the locking device is easily disengaged to move the crank from its operative position to its stored position following the operation of the landing gear assembly.

(2) Description of the Related Art

Many of the different types of trailers that are towed by trucks are connected to the trucks by a releasable coupling such as a gooseneck coupling or a fifth wheel coupling. When the trailer is released from the truck and is no longer supported by the truck at the forward end of the trailer, a landing gear assembly is often used to support the trailer floor or bed in a generally horizontal position.

The typical landing gear assembly is attached to the underside of the trailer adjacent the truck coupling at the forward end of the trailer. The assembly includes a pair of vertically oriented columns positioned adjacent opposite sides of the trailer bed. A vertical leg is mounted on each column. A gear mechanism on each column is selectively operated to lower the legs from the columns, or raise the legs on the columns. The gear mechanisms of the two columns are connected by a shaft assembly that extends across the underside of the trailer between the two columns. A hand crank is connected to the shaft assembly at one side of the trailer. Selectively rotating the hand crank in opposite directions lowers the pair of legs until the legs contact the ground and support the trailer forward end when the trailer is being uncoupled from the truck, or raise the pair of legs when the trailer has been connected to a truck and is ready for towing.

The typical hand crank is connected to the shaft of the landing gear assembly by a pivot connection. The pivot connection enables the hand crank to be pivoted outwardly from a side of the trailer to an operative position of the crank where there is ample clearance to rotate the crank in selectively lowering and raising the legs of the landing gear assembly. When the trailer is being towed, the pivot connection enables the hand crank to be pivoted beneath the landing gear assembly shaft to a stored position where the crank is not projecting outwardly from the side of the trailer.

Many prior art landing gear assemblies have two speed designs that enable the legs of the landing gear assembly to be lowered and raised at different speeds. The input shaft of the landing gear assembly is moved axially inwardly and outwardly relative to the trailer to shift the assembly between the two speeds. For example, the landing gear assembly shaft can be pushed inwardly by the truck operator to shift to a high speed gear. Rotation of the input shaft by the hand crank will then cause the legs of the assembly to be lowered or raised at a faster rate. This enables the legs of the landing gear assembly to be lowered quickly until they come into engagement with the ground when it is desired to uncouple the trailer from the truck. The gear mechanism of the landing gear assembly is then shifted to a low gear ratio by pulling on the crank, moving the input shaft axially outwardly away from the trailer assembly. When shifted to the low gear ratio, more power is transferred to the legs by the reduced gearing of the gear mechanism. For each rotation of the crank the legs are lowered at a slower rate, but more power is transferred to the legs enabling the landing gear assembly to lift the trailer from the truck when uncoupling the trailer from the truck.

The hand crank of current landing gear assemblies typically has a socket at one end. The crank socket end is positioned axially over the end of the landing gear input shaft when positioning the crank in its operative position to turn the input shaft. A yoke is also formed on the socket end of the crank. The yoke has a pair of arms that project axially outwardly from the socket on opposite sides of the input shaft. Each yoke arm has a slot. A pin extends transversely through the end of the landing gear assembly input shaft and opposite ends of the pin are received in the slots of the crank yoke, thereby attaching the yoke to the gear assembly shaft end.

The pin provides a pivot connection between the landing gear assembly input shaft and the crank that enables the crank to be pivoted upwardly to position the crank socket in alignment with the landing gear assembly input shaft end. The slots in the crank yoke enable the crank to be moved axially toward the trailer to its operative position, inserting the end of the landing gear assembly input shaft into the crank socket while the pin on the end of the input shaft moves through the yoke slots.

The crank is moved to a stored position by manually pulling the crank in an axial direction away from the trailer, removing the landing gear assembly shaft end from the crank socket and causing the shaft pin to move through the yoke slots. This enables the hand crank to be pivoted about the pin through the shaft end to a stored position of the crank beneath the shaft.

Because the gear mechanism of the landing gear assembly is shifted between high and low gear by moving the input shaft axially inwardly toward the gear assembly and axially outwardly away from the gear assembly, shifting the gear assembly often results in the crank socket being unintentionally removed from the landing gear assembly shaft end. For example, with the crank in its operative position on the landing gear assembly shaft end and the shaft pushed axially inwardly, if it is desired to shift the gear ratio the gear assembly shaft must be moved axially outwardly by the hand crank. As a result, the crank socket will disengage from the landing gear shaft when the crank is pulled outwardly to shift gears. This makes it necessary to then push the crank inwardly positioning the socket back over the shaft end, while being careful not to push the landing gear assembly out of the shifted gear while reengaging the crank socket on the shaft end. Thus, the prior art landing gear assemblies are disadvantaged in that shifting the gear assembly by pulling the shaft outwardly often results in the crank being disengaged from the gear assembly input shaft.

A further disadvantage of prior art landing gear assemblies is that the crank is not secured in place to the landing gear input shaft, but is just pushed over the end of the input shaft for the short distance of the shaft end that engages in the crank socket. Only the friction engagement between the shaft end and the interior surface of the crank socket maintains the crank on the landing gear assembly input shaft. There is no positive lock or positive engagement between the crank and the input shaft, and all cranks can come off of the input shaft while the crank is being used to manually turn the shaft, and when the crank is being used to shift the input shaft outwardly when shifting the landing gear assembly.

Prior art landing gear assemblies are also disadvantaged in that the connection of the hand crank to the landing gear assembly input shaft typically has a great deal of clearance between the crank socket and the shaft end and between the crank yoke slots and the shaft pin. This results in the crank being loosely attached to the landing gear shaft end. This loose attachment of the crank allows the crank to wobble as the truck driver is attempting to rotate the landing gear shaft with the crank, which adds to the difficulty of rotating the shaft.

SUMMARY OF THE INVENTION

The hand crank of the present invention overcomes the disadvantages associated with the prior art landing gear assembly hand cranks by providing a hand crank with a locking device that securely attaches the hand crank to the landing gear assembly input shaft in the operative position of the crank, and is quickly and easily unlocked from the input shaft enabling the hand crank to be pivoted to its stored position.

The crank of the invention is similar to prior art crank constructions. The crank is basically a hollow tube having a length formed in a general S-shape with a handle at one end and an open socket at the opposite end.

A yoke is also provided on the socket end of the crank, as in prior art cranks. The yoke has a pair of arms that project outwardly from the crank socket end, and each of the arms also has a slot. The crank of the invention differs from prior art cranks in that an abutment is provided on an exterior surface of one of the yoke arms. In the preferred embodiment, the abutment is formed by a sidewall of a circular cavity recessed into the exterior surface of the yoke arm. A portion of the cavity sidewall is intersected by one of the yoke arm slots and functions as the abutment surface of the invention.

A pin extends through the landing gear shaft and the yoke arm slots, thereby connecting the crank to the shaft end in the same manner as the prior art crank. The pin has first and second heads at opposite ends of the pin. The heads prevent the pin from being withdrawn from the shaft end and from the crank yoke. The pin differs from the pin of the prior art in that a lock member is provided on the pin. The lock member is positioned on the pin to engage inside the yoke cavity and against the abutment surface of the cavity when the crank is positioned in its operative position relative to the shaft. With the lock member in the crank arm cavity, the lock member engages against the cavity sidewall or abutment surface of the crank, preventing the crank from being pulled from the shaft end. In one embodiment, the lock member is a circular disk on a lock nut threaded onto an end of the shaft pin. In a second embodiment, the lock member is a circular disk or washer mounted on the pin.

In both embodiments of the invention, a spring is provided on the pin to bias the disk lock member into the cavity on the crank arm. Two different embodiments of the invention employ two different types of biasing springs.

In the first embodiment of the invention, the pin is a threaded bolt and the lock member is a disk on a lock nut threaded on one end of the pin. The opposite end of the pin has a bolt head. A coil spring is mounted on the pin between the head of the pin and one of the crank arms. The coil spring pushes the pin head outwardly away from the crank arm, and thereby biases the lock member on the pin lock nut toward the abutment surface of the cavity in the other crank arm. The engagement of the lock member in the cavity prevents the crank from being pulled axially away from the landing gear assembly input shaft.

To disengage the crank for movement relative to the landing gear assembly shaft, the truck driver merely presses inwardly on the pin bolt head compressing the coil spring. This causes the disk on the lock nut to move outwardly from the yoke cavity and disengage from the cavity abutment surface. This frees the pin for movement through the crank arm slots, and enables the crank socket to be withdrawn from the landing gear assembly shaft end. With the socket removed from the end of the input shaft, the crank may then be pivoted about the pin to its stored position beneath the shaft in the conventional manner.

The second embodiment of the pin is similar to the first embodiment in that the pin also has a bolt head and a nut at opposite ends of the pin and on opposite sides of the input shaft. However, instead of a coil spring, a disk spring like a Belleville spring is mounted on the pin adjacent pin bolt head and the yoke cavity of the crank. A washer is also mounted on the pin between the disk spring and the yoke cavity. The washer functions as the lock member of the pin. The disk spring biases the washer into the yoke cavity in securely locking the crank in its operative position on the end of the landing gear assembly input shaft.

To unlock the crank, it is only necessary that a sufficient pulling force be exerted on the crank, pulling the crank socket away from the end of the landing gear assembly input shaft. The axial force exerted on the crank causes the abutment surface of the yoke cavity sidewall to push the lock member outwardly on the pin and compress the disk spring. This disengages the lock member from the crank yoke cavity and allows the crank socket to be moved away from the end of the landing gear assembly input shaft. The crank can then be pivoted about the pin to its stored position beneath the input shaft.

Both embodiments of the hand crank locking device of the invention require only minimal modifications to the component parts used in a conventional pivoting connection between a hand crank and a landing gear assembly input shaft, and thereby provide the benefits of a hand crank that is easily locked to the input shaft in its operative position and is easily unlocked from the input shaft, without appreciably increasing the cost of manufacturing the hand crank and its connecting assembly to the input shaft.

DESCRIPTION OF THE DRAWING FIGURES

Further features of the invention are set forth in the following detailed description of the preferred embodiments of the invention, and in the following drawing figures wherein.

DETAILED DESCRIPTION OF THE
PREFERRED EMBODIMENTS

Figure 1:
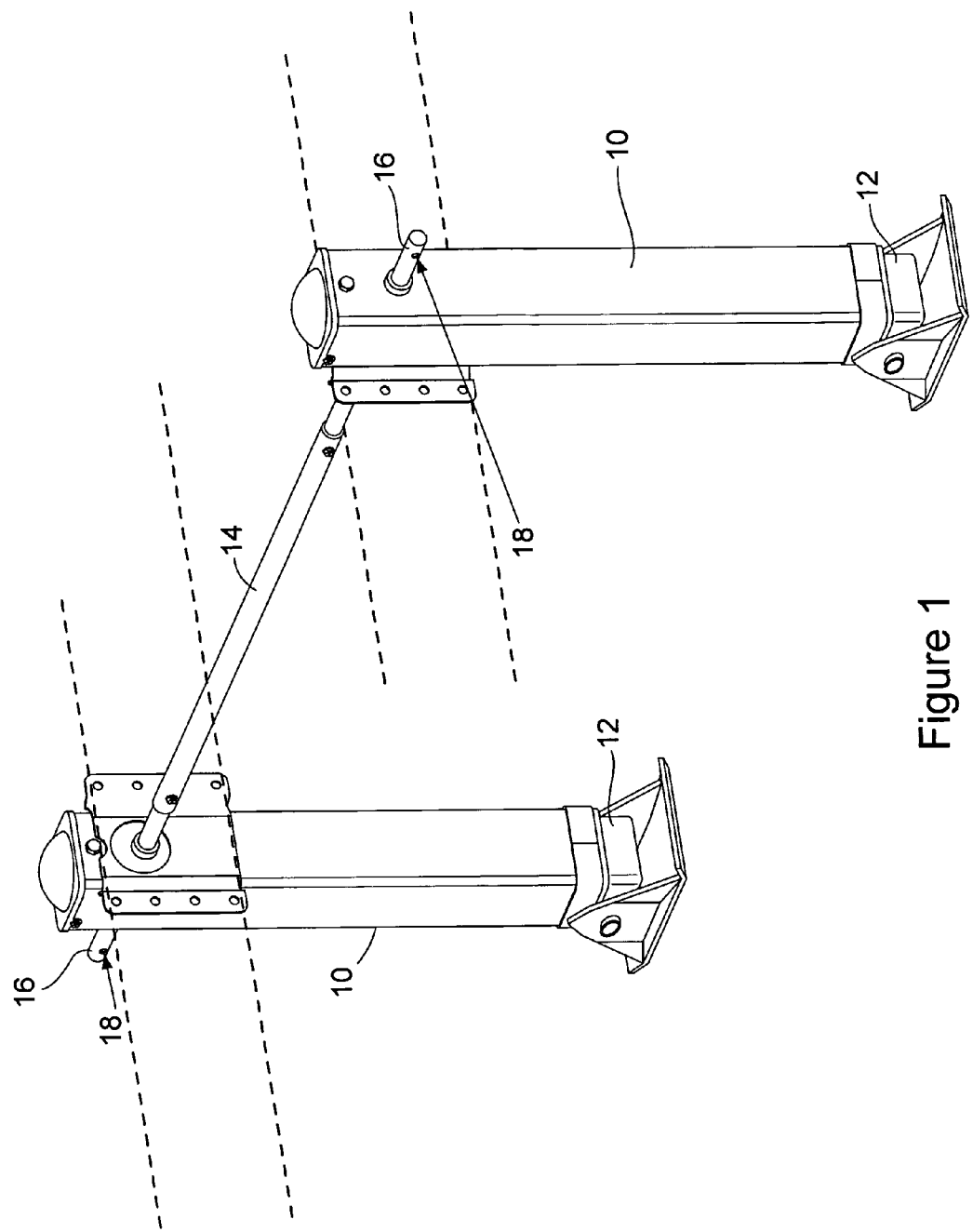
FIG. 1 is a partial perspective view of one operative environment of the invention.

FIG. 1 shows one example of a manual drive apparatus that can be improved with the secure crank locking device of the present invention. It should be understood that the environment of FIG. 1 is only one example of an environment in which the secure crank locking device of the invention may be used. It is not intended that the secure crank locking device of the invention be limited to use with mechanisms such as that shown in FIG. 1.

FIG. 1 shows an example of a trailer landing gear assembly that is attached to frame members of a truck trailer represented by the dashed lines in FIG. 1. Landing gear assemblies of the type shown in FIG. 1 are known in the art, and therefore the assembly shall only be described generally herein. As described earlier, the typical landing gear assembly includes a pair of vertically oriented columns 10 positioned at opposite sides of the truck trailer. A vertical leg 12 is mounted inside each column 10. A gear mechanism (not shown) in each column is selectively operated to raise and lower the legs 12 relative to the columns. The gear mechanisms of the two columns 10 are interconnected by an input shaft 14 that extends across the underside of the truck trailer between the two columns. The opposite ends 16 of the shaft 14 project outwardly from the opposite sides of the truck trailer. Each of the shaft ends 16 has a pin hole 18 that extends through the shaft end. A selected one of the shaft pin holes 18 receives a pin (not shown) that selectively mounts a hand crank to the shaft end 16. The pin mounts the hand crank to the shaft end for pivoting movement of the hand crank upwardly to an operative position of the crank relative to the shaft, and downwardly to a stored position of the crank relative to the shaft. As described earlier, with the hand crank in its operative position relative to the shaft 14, rotating the shaft in opposite directions causes the gear mechanisms of the landing assembly columns 10 to respectively lower the landing gear legs 12 relative to the columns, or raise the landing gear legs relative to the columns.

Figure 2:
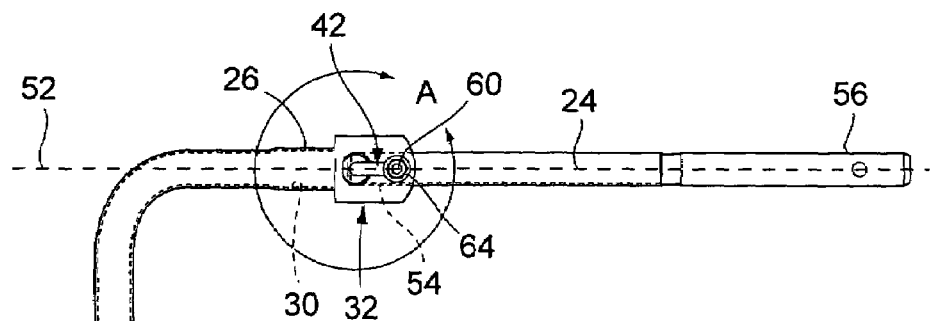
FIG. 2 is a side elevation view of the secure crank of the invention coupled to an input shaft of a mechanism.

FIG. 2 shows the secure crank locking device of the present invention coupling a hand crank 22 to an input shaft 24 of a mechanism, for example the input shaft 14 of FIG. 1. The hand crank 22 is provided with the secure crank locking device of the invention that securely attaches the hand crank to the input shaft 24 in the operative position of the crank, and is quickly and easily unlocked from the input shaft enabling the hand crank to be pivoted to its stored position. The secure crank locking device could be provided as a part of a manufactured landing gear assembly, or could be retrofit to an existing landing gear assembly.

The hand crank 22 of the invention is similar to prior art crank constructions. The crank 22 is basically a hollow tube having a length that has been formed in a general S-shape with opposite proximal 26 and distal 28 ends. A handle sleeve 29 is mounted on the crank distal end 28 for rotation of the sleeve on the crank end. The opposite proximal end 26 of the crank is formed with an internal socket 30.

Figure 4:
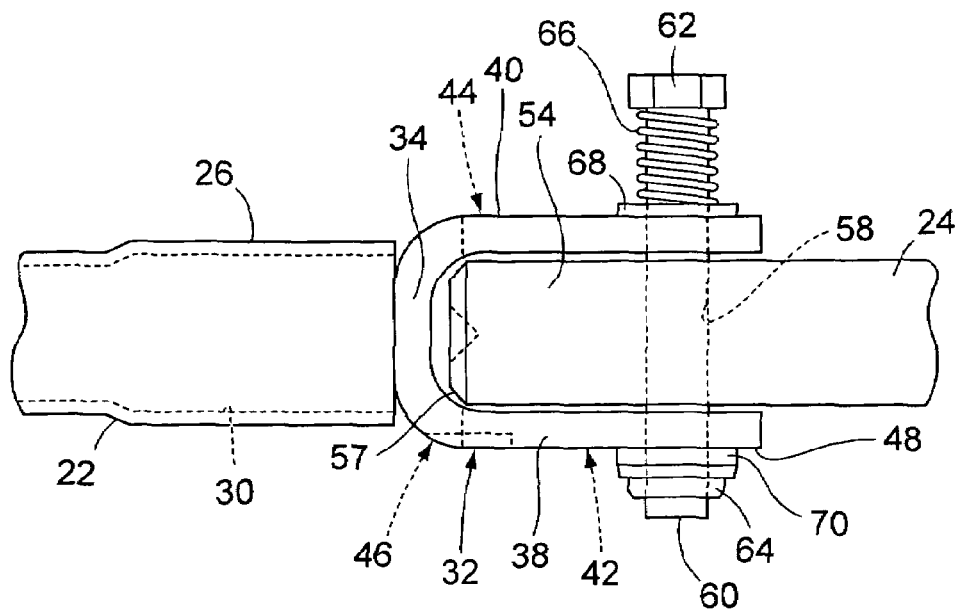
FIG. 4 is a plan view of the crank and shaft portions shown in FIG. 3.
Figure 5:
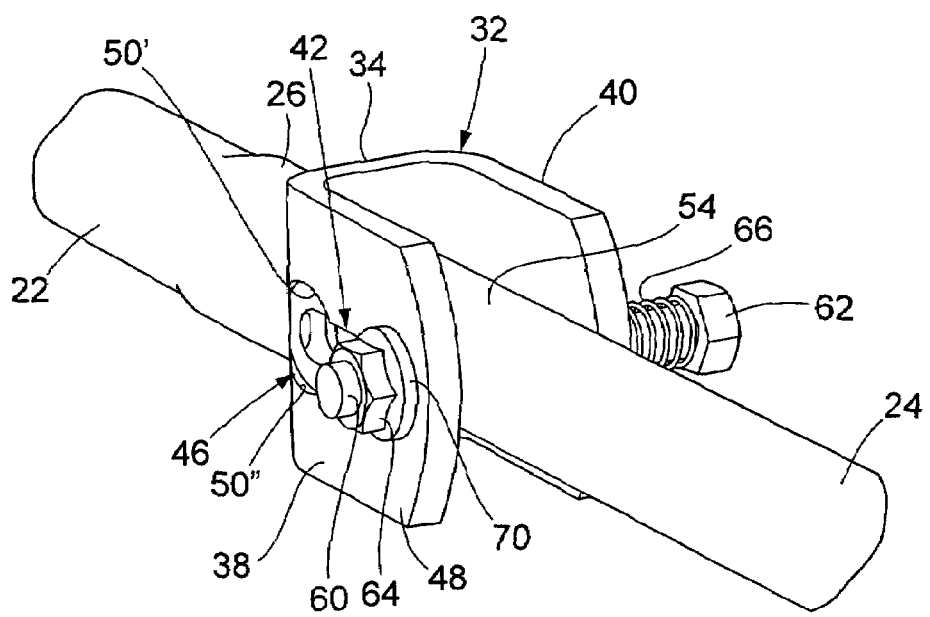
FIG. 5 is a perspective view of the crank and shaft portions shown in FIG. 3.

A U-shape yoke 32 is secured to the crank proximal end 26. The yoke 32 has a base 34 secured to the crank proximal end 26 by welds or other equivalent means. A hole 36 passes through the yoke base 34 and is dimensioned to be continuous with the interior diameter dimension of the crank socket 30. The yoke has a pair of arms or flanges 38, 40 that project outwardly away from the yoke base 34 and away from the crank proximal end 26. As seen in FIG. 4, each of the yoke arms 38 has a spacing between the arms that is slightly larger than the diameter of the yoke base hole 36 and the interior diameter of the crank socket 30. As an alternative, the crank 22 could be formed with a pair of integral arms 38, 40 that project outwardly from opposite sides of the crank socket 30.

Oblong holes 42, 44 are formed through each of the crank yoke arms 38, 40. The crank holes 42, 44 are aligned with each other and extend along the lengths of the yoke arms 38, 40.

Figure 3:
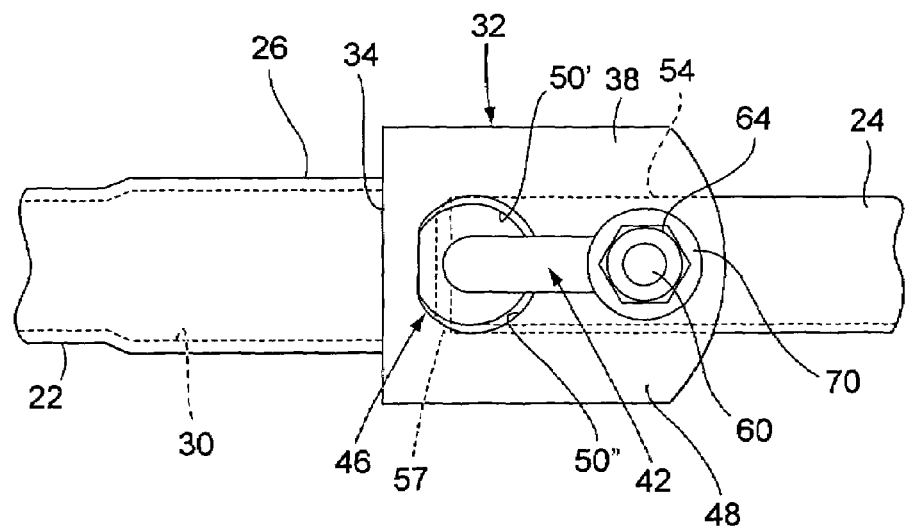
FIG. 3 is an enlarged partial view of the crank and shaft portions shown in the circle A of FIG. 2.

As shown in FIG. 3, a circular cavity 46 is recessed into the exterior surface 48 of one of the crank yoke arms 38. The cavity 46 can be coined into the arm exterior surface 48, or formed by some other method. The cavity 46 has a generally circular sidewall that surrounds the cavity 46 and extends into the yoke arm 38 below the yoke arm exterior surface 48. The cavity 46 intersects one end of the crank arm hole 42. The intersection of the crank arm hole 42 with the cavity 46 divides the cavity sidewall into a pair of sidewall portions 50', 50" on opposite sides of the crank arm hole 42. The sidewall portions 50', 50" are oriented at an angle relative to the yoke arm exterior surface 48 and form an abutment on the crank arm 22 that functions as a portion of the secure crank locking device of the invention.

In alternate embodiments, the abutment on the crank arm could be provided by other equivalent means. For example, the abutment could be a ridge formed on the arm exterior surface, or a bend formed in the crank arm. Both the ridge and the bend would traverse and intersect the slot.

The input shaft 24 is constructed in basically the same manner as the prior art input shaft. The shaft 24 has a length with a center axis of rotation 52 and opposite proximal 54 and distal 56 ends. A pair of pin holes 58 extend transversely through the shaft adjacent the opposite shaft ends 54, 56. The hand crank 22 of the invention will be described as being connected to the shaft proximal end 54. However, the hand crank 22 could be connected to the opposite shaft distal end 56 if so desired. The shaft proximal end 54 is provided with a tapered surface 57 that assists in inserting the shaft end into the crank socket 30.

A shaft pin 60 extends through the pin hole 58 at the shaft proximal end 54. As seen in FIG. 4, the pin 60 is a bolt having a bolt head 62 at one end of the pin and a locking nut 64 screw threaded on the opposite end of the pin. A carriage bolt may be preferred because its head is shaped like a push button. Other equivalent types of pins having heads formed at their opposite ends could also be used. The pin has a length between the bolt head 62 and the locking nut 64 that is larger than the combined widths of the shaft proximal end 54 and the crank yoke arms 38, 40. The pin 60 extends through the crank arm holes 42, 44 and connects the hand crank 22 to the input shaft 24 for pivoting movement of the crank between operative and stored positions in the same manner as prior art hand crank and landing gear assemblies.

However, the shaft pin 60 has a length that is longer than the pin of the prior art. The additional pin length allows the pin to accommodate a coil spring 66 and a washer 68 on the pin. As seen in FIG. 4, the coil spring 66 and the washer 68 are mounted on the pin 60 between the bolt head 62 and the crank arm 40 that does not have the recessed cavity 46. This results in the coil spring 66 exerting a pulling force on the pin 60 that pulls the lock nut 64 into engagement with the exterior surface 48 of the crank arm 38 that does have the cavity 46.

The lock nut 64 is provided with a lock member 70 that is formed as a circular disk on the side of the nut adjacent the crank arm 38. The lock member disk 70 is dimensioned to fit inside the cavity 46 in the crank arm 38.

FIGS. 2-4 show the pin 60 in a disengaged or unlocked position relative to the hand crank 22 and the input shaft 24. In this position of the pin, the lock member disk 70 is outside the crank arm cavity 46 and is held against the crank arm exterior surface 48 by the biasing force exerted by the coil spring 66 on the pin bolt head 62. With the pin 60 in its unlocked position of FIGS. 2-4, the hand crank 22 is free to pivot about the pin 60 relative to the input shaft 24 from the raised position of the crank shown in FIG. 2, to a stored position of the crank (not shown) where the crank is pivot downwardly to a position of the crank beneath the input shaft 24.

Figure 6:
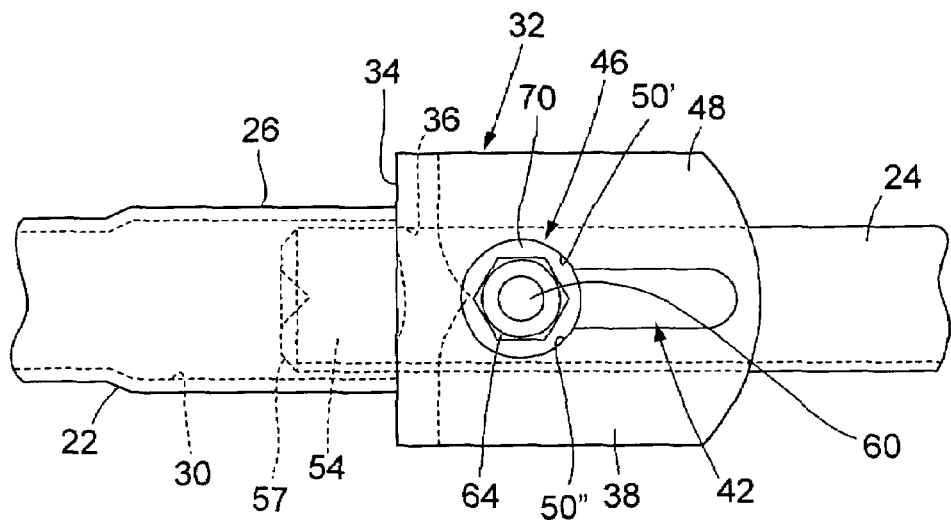
FIG. 6 is a side view of the crank and shaft portions in their locked relative positions.
Figure 7:
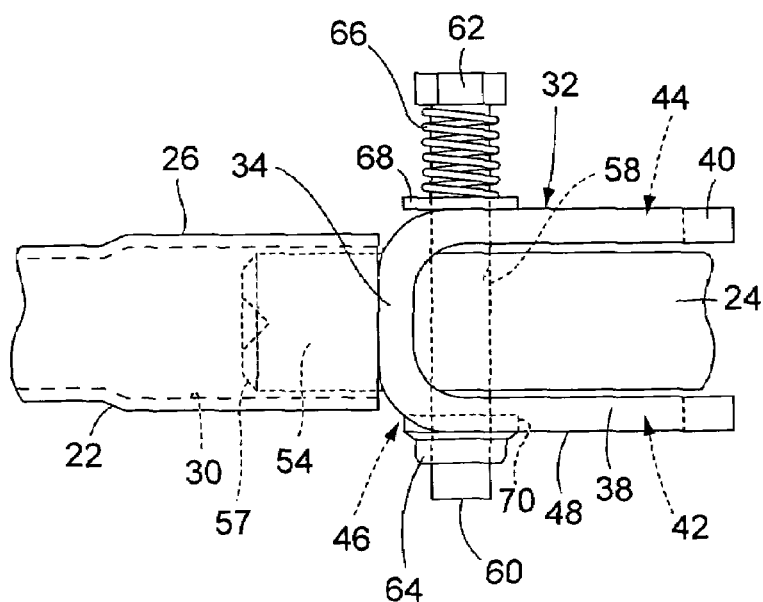
FIG. 7 is a plan view of the crank and shaft portions shown in FIG. 6.
Figure 8:
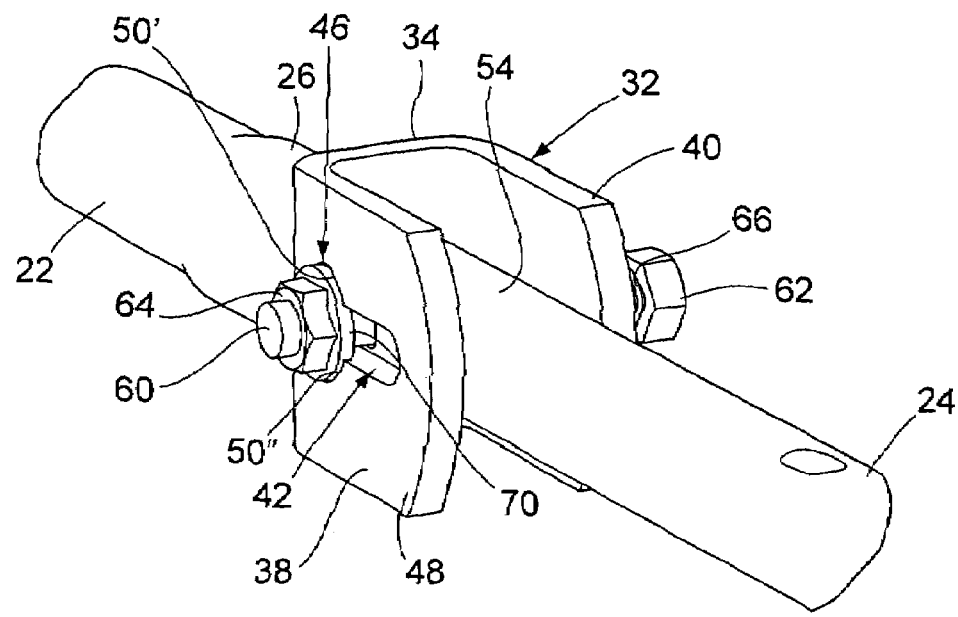
FIG. 8 is a perspective view of the crank and shaft portions shown in FIG. 6.

FIGS. 6-8 show the pin 60 in its engaged or locked position relative to the hand crank 22 and the input shaft 24. To move the pin 62 to the locked position shown, the crank 22 is first moved upwardly from the stored position beneath the input shaft, to the position of the crank shown in FIG. 2. In other embodiments of the crank, a rod or landing extends across the tops of the yoke arms 38, 40 to engage against the top of the input shaft end 54 and assist in positioning the crank socket 30 opposite the shaft end. The crank 22 is then moved axially toward the input shaft 24, inserting the shaft proximal end 54 into the crank socket 30. This causes the pin 60 to move from its position shown in FIG. 3, through the crank arm holes 42 to the position of the pin shown in FIGS. 6-8. As the pin 60 approaches the cavity 46, the biasing force of the coil spring 66 on the pin bolt head 62 causes the lock member disk 70 to snap into the cavity 46. This locks the crank 22 in its operative position on the input shaft 24 with the shaft end 54 inserted into the crank socket 30. With the lock member disk 70 positioned in the cavity 46, pulling on the hand crank 22 attempting to move the crank back to its position relative to the input shaft 24 shown in FIG. 2 is resisted by the engagement of the lock member disk 70 against the cavity sidewall portions 50', 50" that straddle the yoke arm hole 42. Thus, the hand crank 22 is locked securely in its operative position relative to the input shaft 24 and cannot be inadvertently disengaged from the input shaft while turning the shaft, or while moving the shaft axially with the crank.

To disengage the crank 22 for movement relative to the shaft 24, the pin bolt head 62 is pushed toward the shaft proximal end 54 compressing the coil spring 66. This causes the lock member disk 70 to move out of the cavity 46 in the crank arm 38. With the lock member disk 70 displaced from the cavity 46, pulling on the hand crank 22 allows it to move relative to the input shaft 24 to the position of the crank shown in FIG. 2. This withdraws the shaft proximal end 54 from the crank socket 30 and permits the crank 22 to be pivoted about the pin 60 to its stored position beneath the input shaft 24.

Figure 9:
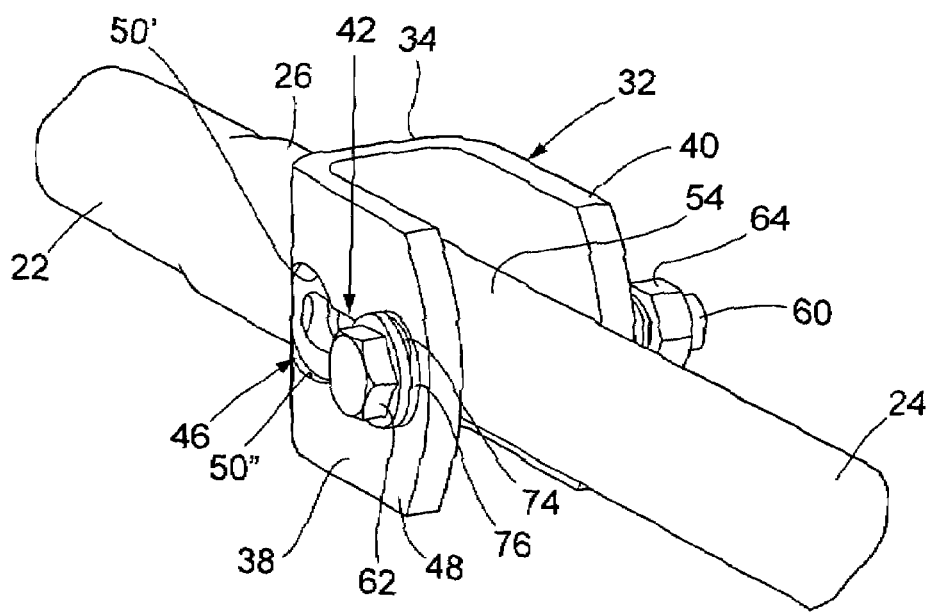
FIG. 9 is a perspective view of the crank and shaft portions shown in FIG. 5 with a second embodiment of the lock member in its unlocked position; and, FIG. 10 is a perspective view of the crank and shaft portions shown in FIG. 9 with the lock member in the locked position.
Figure 10:
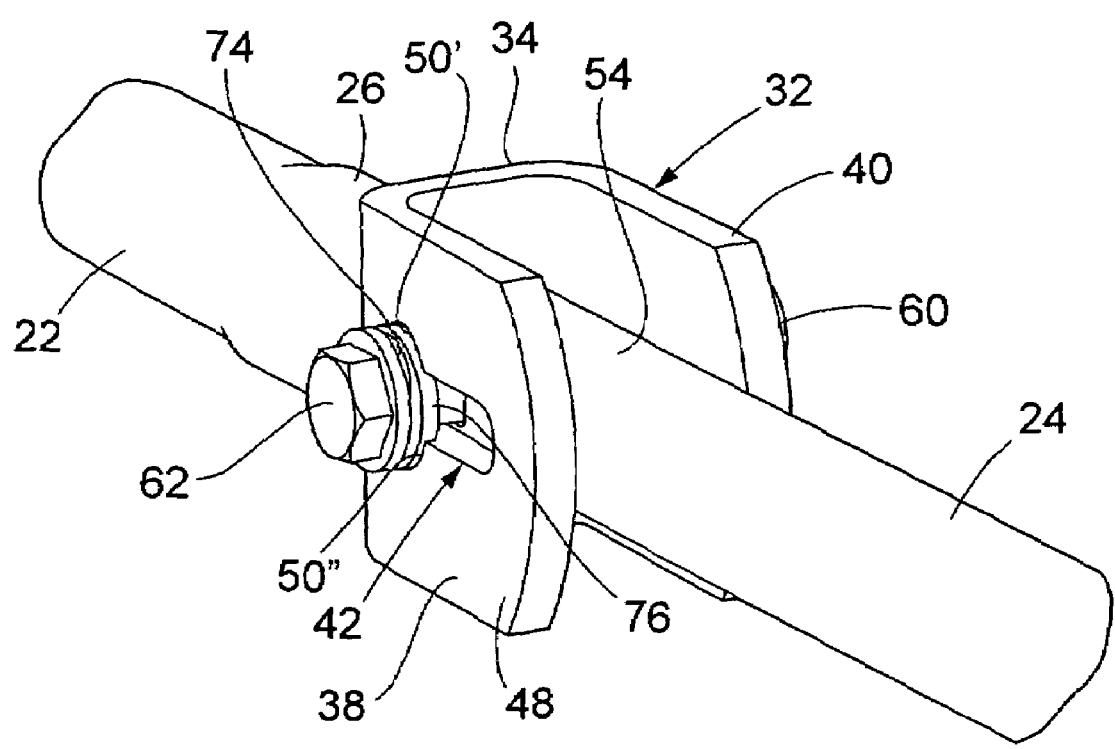

FIGS. 9 and 10 show an alternate embodiment of the secure crank locking device of the present invention. Many of the component parts of the locking device shown in FIGS. 9 and 10 are the same as those of the previously described embodiment and are identified by the same reference numbers.

The embodiment of FIGS. 9 and 10 differs from the previous embodiment in that the length of the pin 60 is not as long as the previously described embodiment, and the coil spring of the previously described embodiment is replaced by a disk spring 74, for example a wave spring or Belleville spring. FIG. 9 shows the pin 60 reversed in its position through the shaft hole 58 from the previously described embodiment. The bolt head 62 of the pin is positioned adjacent the exterior surface 48 of the crank yoke arm 38 having the cavity 46. The disk spring 74 is mounted on the pin 60 adjacent the bolt head 62. In this embodiment, the lock member is provided by a washer 76 mounted on the pin 60 between the disk spring 74 and the crank arm exterior surface 48 having the cavity 46. Thus, the disk spring 74 biases the lock member washer 76 against the crank arm exterior surface 48.

FIG. 9 shows the crank 22 and input shaft 24 in the disengaged or unlocked position of the lock member 76. In this position the hand crank 22 is free to pivot about the pin 60 relative to the input shaft 24. To secure the hand crank 22 to the input shaft 24, the crank is first moved so that the crank socket 30 is positioned opposite the shaft proximal end 54 as shown in FIG. 9. The crank proximal end 26 is then moved toward the shaft proximal end 54, inserting the shaft proximal end into the crank socket 30. This causes the pin 60 to move through the crank arm holes 42, 44 with the lock member 76 being pushed against the crank arm exterior surface 48 by the bias of the disk spring 74. When the lock member washer 76 arrives at the cavity 46 in the crank arm exterior surface 48, the disk spring 74 pushes the lock member washer 76 into the cavity 46, securing the hand crank 22 to the input shaft 24.

To disengage the lock member washer 76, the hand crank 22 is first pulled from the input shaft 24. This causes the lock member washer 76 to engage against the cavity sidewall portions 50', 50" on the opposite sides of the crank arm hole 42. Increasing the manual force pulling the hand crank 22 from the input shaft 24 increases the force exerted by the cavity sidewall portions 50', 50" against the lock member washer 76 which tends to compress the disk spring 74. When sufficient force is exerted on the hand crank 22, the disk spring 74 is compressed and the lock member washer 76 rises out of the cavity 46, thereby unlocking the hand crank 22 from the input shaft 24. This allows the hand crank socket 30 to be disengaged from the shaft end 54, and allows the hand crank 22 to be pivoted about the pin 60 to its stored position beneath the input shaft 24.

Although the secure crank locking device of the invention has been described above by referring to two embodiments of the invention, it should be understood that modifications and variations could be made to the device without departing from the intended scope of the following claims.

The invention claimed is:

1. A manual drive apparatus providing input rotation to a mechanism, the apparatus comprising:
   an input shaft having an axis of rotation and a shaft end;
   a crank connected to the shaft end for movement of the crank between first and second axially spaced positions of the crank relative to the shaft, where in the first position the crank is secured stationary to the shaft and in the second position the crank is free to pivot relative to the shaft;
   an abutment on the crank that moves with the crank to the first and second positions of the crank; and,
   a lock member mounted on the shaft for movement of the lock member transverse to the shaft axis between transversely spaced locked and unlock positions of the lock member relative to the shaft, where the lock member engages with the abutment when the crank is in the first position and the lock member is in the locked position, and the lock member engaging with the abutment resists movement of the crank from the first position to the second position relative to the shaft, and where the lock member disengages from the abutment when the crank is in the first position and the lock member is in the unlocked position, and the lock member in the unlocked position does not resist movement of the crank from the first position to the second position relative to the shaft.

2. The apparatus of claim 1, further comprising:
the crank having a socket at an end of the crank and the shaft end being positioned inside the socket when the crank is in the first position relative to the shaft, and the shaft end being positioned outside the socket when the crank is in the second position relative to the shaft.

3. The apparatus of claim 2, further comprising:
a pin extending through the shaft and being movable relative to the shaft; and,
the lock member being on the pin.

4. The apparatus of claim 3, further comprising:
a spring on the pin biasing the lock member toward the shaft.

5. The apparatus of claim 4, further comprising:
the spring being positioned on the pin relative to the shaft to operatively pull the lock member toward the shaft.

6. The apparatus of claim 4, further comprising:
the spring being positioned on the pin relative to the shaft to operatively push the lock member toward the shaft.

7. The apparatus of claim 4, further comprising:
the pin having first and second heads at opposite ends of the pin and on opposite sides of the shaft; and,
the spring being positioned between the shaft and one of the pin first and second heads.

8. The apparatus of claim 3, further comprising:
the crank having a hole; and,
the pin extending through the crank hole and connecting the crank to the shaft for pivoting movement of the crank about the pin when the crank is in the second position relative to the shaft.

9. The apparatus of claim 8, further comprising:
the hole having a length with opposite first and second ends; and,
the pin moving through the hole length from the first end to the second end of the hole in response to the crank moving from the first position to the second position relative to the shaft.

10. The apparatus of claim 8, further comprising:
the crank hole and the abutment being positioned side by side.

11. The apparatus of claim 8, further comprising:
the crank hole having a length that extends through and divides the abutment with portions of the abutment being positioned on opposite sides of the crank hole.

12. The apparatus of claim 8, further comprising:
biasing means on the pin urging the lock member toward the shaft.

13. The apparatus of claim 12, further comprising:
the biasing means pulling the lock member toward the shaft.

14. The apparatus of claim 12, further comprising:
the biasing means pushing the lock member toward the shaft.

15. The apparatus of claim 1, further comprising:
the mechanism being a landing gear mechanism.

16. The apparatus of claim 1, further comprising:
the crank having an exterior surface; and,
the abutment comprising a cavity recessed into the crank exterior surface, the cavity having a sidewall that is oriented at an angle relative to the crank exterior surface, and the sidewall being positioned to engage with the lock member when the crank is in the first position and the lock member is in the locked position and thereby resist movement of the crank from the first position to the second position relative to the shaft, and the sidewall being positioned to disengage from the lock member when the lock member is moved from the locked position to the unlocked position enabling movement of the crank from the first position to the second position of the crank relative to the shaft.

17. The apparatus of claim 16, further comprising:
a pin extending through the shaft and being movable relative to the shaft; and,
the lock member being on the pin.

18. The apparatus of claim 17, further comprising:
a spring on the pin operatively urging the lock member toward the shaft.

19. The apparatus of claim 18, further comprising:
the spring on the pin operatively pulling the lock member toward the shaft.

20. The apparatus of claim 18, further comprising:
the spring on the pin operatively pushing the lock member toward the shaft.

21. The apparatus of claim 18, further comprising:
the pin having first and second heads at opposite ends of the pin and on opposite sides of the shaft; and,
the spring being positioned between one of the pin first and second heads and the shaft.

22. The apparatus of claim 16, further comprising:
the crank having a hole; and,
a pin extending through the shaft and through the crank hole connecting the crank to the shaft for pivoting movement of the crank about the pin when the crank is in the second position relative to the shaft; and,
the lock member being on the pin.

23. The apparatus of claim 22, further comprising:
the hole intersecting the cavity.

24. The apparatus of claim 23, further comprising:
the hole dividing the cavity sidewall into two sidewall portions positioned on opposite sides of the hole.

25. A manual drive apparatus for providing input rotation to a mechanism, the apparatus comprising:
an input shaft having a center axis of rotation that defines mutually perpendicular axial and transverse directions were the axial direction is along the input shaft axis and the transverse direction is transverse to the input shaft axis, the input shaft having a shaft end and a transverse hole through the input shaft adjacent the shaft end;
a pin mounted in the shaft hole for transverse movement of the pin between a locked position and an unlocked position of the pin relative to the input shaft, the pin having a lock member on the pin;
a hand crank having a flange with an oblong hole, the hand crank being attached to the input shaft by the pin extending through the oblong hole, the pin in the oblong hole enabling the crank to move in a pivoting movement about the pin relative to the input shaft, and the pin in the oblong hole enabling the crank to move axially toward the input shaft from a first position of the crank relative to the input shaft to a second position of the crank relative to the input shaft by the pin moving through the oblong hole between respective first and second positions of the pin in the oblong hole, and the pin in the oblong hole enabling the crank to move axially away from the input shaft from the second position to the first position of the crank relative to the input shaft by the pin moving through the oblong hole from the second position to the first position of the pin in the oblong hole; and, an abutment on the flange positioned adjacent the oblong hole where the abutment is positioned axially adjacent and will engage the pin lock member when the crank is in the second position relative to the input shaft and the pin is in the first position relative to the input shaft with the abutment engaging with the pin lock member preventing the crank from being moved from the second position to the first position of the crank relative to the input shaft, and where the pin lock member is movable transversely away from the abutment and is movable axially over the abutment when the crank is in the second position relative to the input shaft and the pin is moved from the first position to the second position of the pin relative to the input shaft enabling the crank to move from the second position to the first position of the crank relative to the input shaft.

26. The apparatus of claim 25, further comprising:
the abutment extending transverse to and intersecting the oblong hole.

27. The apparatus of claim 25, further comprising:
the abutment having a pair of portions positioned on opposite sides of the oblong hole.

28. The apparatus of claim 25, further comprising:
a spring on the pin biasing the pin from the second position to the first position of the pin relative to the input shaft.

29. The apparatus of claim 25, further comprising:
the flange being one of a pair of flanges on the hand crank, each flange having an oblong hole; and,
the input shaft end being positioned between the pair of flanges with the pin extending through the oblong hole in each flange.

30. The apparatus of claim 25, further comprising:
the pin having the lock member at one end of the pin and a head at an opposite end of the pin that prevent the pin from being withdrawn from the shaft hole.

31. The apparatus of claim 25, further comprising:
the input shaft being an input shaft to a trailer landing gear assembly.

32. A manual drive apparatus for providing input rotation to a mechanism, the apparatus comprising:
an input shaft having a center axis of rotation that defines mutually perpendicular axial and transverse directions where the axial direction is along the input shaft axis and the transverse direction is transverse to the input shaft axis, the input shaft having a shaft end and a transverse hole through the input shaft adjacent the shaft end;
a pin mounted in the shaft hole for transverse movement of the pin between a locked position and an unlocked position of the pin relative to the input shaft, the pin having a lock member on the pin;
a hand crank having a flange with an oblong hole, the hand crank being attached to the input shaft by the pin extending through the oblong hole, the pin in the oblong hole enabling the crank to move in a pivoting movement about the pin relative to the input shaft, and the pin in the oblong hole enabling the crank to move axially toward the input shaft from a first position of the crank relative to the input shaft to a second position of the crank relative to the input shaft by the pin moving through the oblong hole between respective first and second positions of the pin in the oblong hole, and the pin in the oblong hole enabling the crank to move axially away from the input shaft from the second position to the first position of the crank relative to the input shaft by the pin moving through the oblong hole from the second position to the first position of the pin in the oblong hole; and, a sidewall that extends transversely into the flange from an exterior surface of the flange and intersects the oblong hole, the sidewall being positioned in the flange axially adjacent the pin lock member where the sidewall will engage with the lock member when the crank is in the second position relative to the input shaft and the pin is in the first position relative to the input shaft with the sidewall engaging with the lock member preventing the crank from being moved from the second position to the first position of the crank relative to the input shaft, and where the lock member is moved transversely away from the sidewall enabling the lock member to move axially over the sidewall when the crank is in the second position relative to the input shaft and the pin is moved from the first position to the second position of the pin relative to the input shaft enabling the crank to move from the second position to the first position of the crank relative to the input shaft.

33. The apparatus of claim 32, further comprising:
the sidewall does not extend entirely through the flange and forms a recessed cavity in the exterior surface of the flange.

34. The apparatus of claim 32, further comprising:
the sidewall being a circular sidewall that extends transversely into the flange from the flange exterior surface.

35. The apparatus of claim 34, further comprising:
the circular sidewall being dimensioned to surround the lock member.

36. The apparatus of claim 32, further comprising:
the sidewall having portions on opposite sides of the oblong hole.

37. The apparatus of claim 32, further comprising:
a spring on the pin biasing the pin from the second position to the first position of the pin relative to the input shaft.

38. The apparatus of claim 32, further comprising:
the flange being one of a pair of flanges on the hand crank, each flange having an oblong hole; and,
the input shaft end being positioned between the pair of flanges with the pin extending through the oblong hole in each flange.

39. The apparatus of claim 32, further comprising:
the pin having the lock member at one end of the pin and a head at an opposite end of the pin that prevent the pin from being withdrawn from the shaft hole.

40. The apparatus of claim 32, further comprising:
the input shaft being an input shaft to a trailer landing gear assembly.

* * * * *